United States Patent
Hanks et al.

(10) Patent No.: US 9,579,873 B2
(45) Date of Patent: Feb. 28, 2017

(54) METHOD AND APPARATUS FOR REWORKING STRUCTURES

(71) Applicant: The Boeing Company, Chicago, IL (US)

(72) Inventors: Dennis James Hanks, Enumclaw, WA (US); Jack A. Woods, Kent, WA (US)

(73) Assignee: THE BOEING COMPANY, Chicago, IL (US)

(*) Notice: Subject to any disclaimer, the term of this patent is extended or adjusted under 35 U.S.C. 154(b) by 564 days.

(21) Appl. No.: 13/761,785

(22) Filed: Feb. 7, 2013

(65) Prior Publication Data

US 2014/0216634 A1 Aug. 7, 2014

(51) Int. Cl.
- *B32B 38/08* (2006.01)
- *B29C 70/44* (2006.01)
- *B29C 73/10* (2006.01)
- *B29C 73/12* (2006.01)

(52) U.S. Cl.
CPC .......... *B32B 38/08* (2013.01); *B29C 70/443* (2013.01); *B29C 73/10* (2013.01); *B29C 73/12* (2013.01); *Y10T 156/1798* (2015.01)

(58) Field of Classification Search
CPC ....... B29C 70/443; B29C 73/12; B29C 73/10; B29C 73/30
USPC ... 156/98, 94, 382, 245, 285, 286, 289, 391; 264/257, 259, 263, 258, 571, 510, 511
See application file for complete search history.

(56) References Cited

U.S. PATENT DOCUMENTS

| | | |
|---|---|---|
| 5,699,838 A | 12/1997 | Catallo et al. |
| 6,385,836 B1* | 5/2002 | Coltrin .................. 29/402.18 |
| 6,555,045 B2* | 4/2003 | McClure et al. ............ 264/510 |
| 6,586,054 B2 | 7/2003 | Walsh |
| 6,896,841 B2 | 5/2005 | Velicki et al. |
| 7,138,028 B2 | 11/2006 | Burpo et al. |
| 7,334,782 B2 | 2/2008 | Woods et al. |
| 7,413,694 B2 | 8/2008 | Waldrop, III et al. |
| 7,633,040 B2 | 12/2009 | Glain et al. |
| 7,803,302 B2* | 9/2010 | Hansen .................... 264/258 |
| 2003/0019567 A1 | 1/2003 | Burpo et al. |
| 2008/0220112 A1 | 9/2008 | Waldrop et al. |

(Continued)

FOREIGN PATENT DOCUMENTS

| | | |
|---|---|---|
| EP | 2529921 A1 | 12/2012 |
| GB | 1127691 A | 9/1968 |

(Continued)

OTHER PUBLICATIONS http://www.sciencedirect.com/science/article/pii/S026130690700012X, "experimental and finite element analysis on the performance of vacuum-assisted resin infused single scarf repairs", Hogg et al., Science Direct, sub section 2.3 The resin infusion scarf repair process, Materials & Design, vol. 9, No. 2, 2008, pp. 436-449.*

(Continued)

*Primary Examiner* — Jeff Aftergut
*Assistant Examiner* — Jaeyun Lee
(74) *Attorney, Agent, or Firm* — Yee & Associates, P.C.

(57) ABSTRACT

An area of a structure is reworked from one side of the structure using resin infusion of a dry fiber patch. Entrapped air and excess resin is removed from the patch during the infusion process by inserting a vacuum device into the patch, and forcing the area resin through the vacuum device.

23 Claims, 7 Drawing Sheets

(56) References Cited

U.S. PATENT DOCUMENTS

| | | |
|---|---|---|
| 2009/0309260 A1 | 12/2009 | Keuchel |
| 2011/0036482 A1* | 2/2011 | Stenbaek et al. ............... 156/98 |
| 2012/0305169 A1 | 12/2012 | Hanks et al. |

FOREIGN PATENT DOCUMENTS

| | | | |
|---|---|---|---|
| JP | 58062017 A * | 4/1983 | ............... B29D 3/02 |
| WO | WO2012154544 A2 | 11/2012 | |

OTHER PUBLICATIONS

Hautier et al., "Investigation of a Composite Repair Method by Liquid Resin Infusion," Plastics, Rubber and Composites, vol. 39, Nos. 3-5, Jun. 2010, pp. 200-207.

Karbhari et al., "Strengthening of Concrete Column Stubs through Resin Infused Composite Wraps," Journal of Thermoplastic Composite Materials, vol. 6, Apr. 1993, pp. 92-107.

Sterkenburg et al., "A Titanium and Carbon Fiber Hybrid Repair Patch Using Vacuum Assisted Resin Transfer Molding," Sampe, May 2010, 6 pages.

International Search Report and Written Opinion, dated Apr. 24, 2014, regarding Application No. PCT/US2014/010290, 10 pages.

* cited by examiner

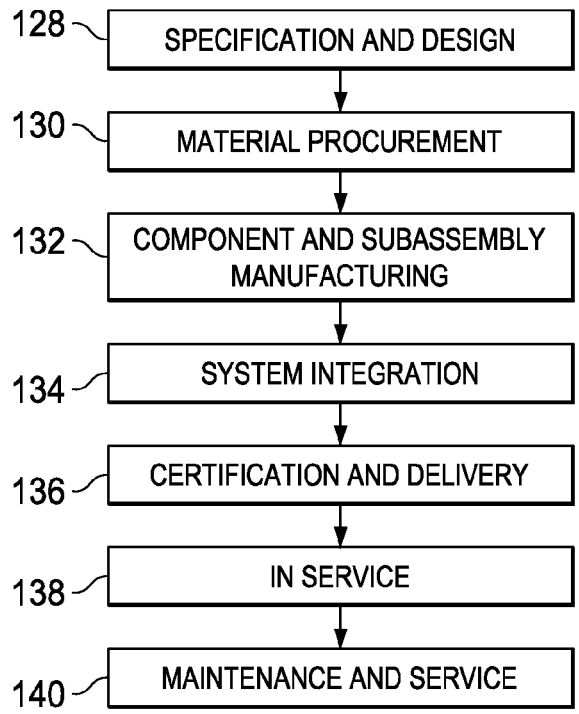
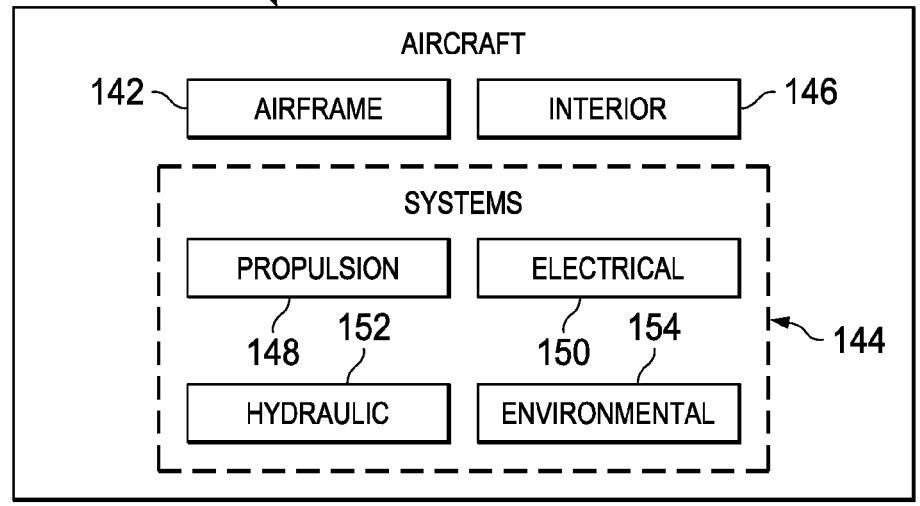

METHOD AND APPARATUS FOR REWORKING STRUCTURES

BACKGROUND INFORMATION

1. Field

The present disclosure generally relates to equipment and processes for reworking and/or reinforcing structures, especially composites, and deals more particularly with a method and apparatus for reworking structures from one side thereof.

2. Background

Composite structures sometimes have localized areas containing one or more inconsistencies that may require rework in order to bring the structure within design tolerances, or to reinforce the area.

One technique for reworking localized areas of structures involves mechanically fastening a patch over the area, however fasteners may increase aircraft weight and/or drag on the aircraft, and may be esthetically undesirable in some applications.

Similarly, bonded rework patches may also require the use of mechanical fasteners to provide secondary load paths forming an arrestment mechanism to limit the growth of an inconsistency.

Still another technique for reworking structures, referred to as a wet layup technique, involves hand-layup of wet plies with fiber reinforcement, such as a woven or knitted fabric, and applying wet resin to the plies as they are laid up. The wet layup technique may result in air entrapment within the patch which may form undesirable porosities in the reworked area. These porosities may have an undesirable affect on the reworked area and may make it difficult to verify that a reworked area meets specifications. The wet layup technique may also be labor intensive, require repair technicians to come into proximity with wet resin, and may require excessive cleanup activity.

In some applications, the problems discussed above may be avoided by employing resin infusion of a dry fiber preform patch. After placing a dry fiber preform on a structure such as a scarfed skin, resin is infused into the fiber preform from the outer side of the skin, while excess resin is being drawn out from the preform from the inner side of the skin. This technique, while effective, requires physical access to both sides of the structure, for example, to the inner and outer sides of a skin. Consequently, this technique may not be suitable for use in applications where one side of the structure is difficult or impossible to access.

Accordingly, there is a need for a method and apparatus for reworking structures, especially composites, which reduce or eliminate porosities due to air entrapment. There is also a need for a method and apparatus as described above may be adapted for use in applications where access to only one side of the structure is possible.

SUMMARY

The disclosed embodiments provide a method and apparatus for reworking structures using resin infusion of a dry fiber preform patch that can be installed and infused with from only one side of the structure, such as from the outside of an aircraft skin. Areas of high pressure within the patch during the resin infusion process are substantially eliminated, thereby avoiding air entrapment and related porosities in reworked area. The embodiments reduce labor, avoid the need for human contact with wet resins and allow rework of load carrying composite structural members. The disclosed method may be implemented using controlled atmospheric pressure resin infusion, allowing the properties of the structure to be optimized.

According to one disclosed embodiment, a method is provided of reworking an area of a structure. The method comprises placing a patch on the structure, inserting a vacuum source into the patch from an outer side of the patch, and using the vacuum source to creating a very low pressure area causing the incoming higher pressure resin to flow through the patch to an inner side of the patch. The patch may be a dry fiber patch. The method may further comprise placing a vacuum bag over the outer side of the patch, evacuating the bag thereby compacting the dry fiber patch, and then infusing the patch with resin by flowing resin into the patch from the outer side thereof. The method may also include removing the vacuum source from the patch after the patch has been infused with resin. The method may further comprise forming a scarf partially through the thickness of the structure, and placing the patch on the structure includes placing the inner side of the patch against a bottom of the scarf. Inserting the vacuum source includes inserting a hollow needle down through the thickest part of the fiber patch to substantially the bottom of the scarf. Inserting the vacuum source further includes inserting the hollow needle through the vacuum bag, and forming a substantially vacuum tight seal between the hollow needle and the vacuum bag. Removing the vacuum source from the fiber patch includes withdrawing the hollow needle from the fiber patch and from the vacuum bag, and sealing a hole in the vacuum bag resulting from penetration of the vacuum bag by the needle. The method may further comprise compacting the resin infused patch after the needle has been withdrawn from the fiber patch, and the bag has been sealed, by evacuating the vacuum bag. Infusing the patch with resin is performed using differential resin pressure. Flowing resin into the fiber patch from the outer side thereof includes placing a resin distribution tube on the outer side of the fiber patch beneath the vacuum bag, and supplying resin to the resin distribution tube.

According to another disclosed embodiment, a method is provided of reworking an area of a structure, comprising forming a scarf partially through a thickness of the structure, fabricating a dry fiber patch having an inner side and an outer side, and installing the patch within the scarf, including placing the inner side of the patch against the structure at a bottom of the scarf. The method also includes installing a vacuum bag over the fiber patch, inserting a vacuum device from the outer side of the patch through the patch, evacuating the bag thereby compacting the dry fiber patch, and then infusing the patch with resin, and using the vacuum device to force resin through the patch to the inner side of the patch. The method further includes removing the vacuum device from the patch after the patch has been infused with resin. Inserting the vacuum device through the patch includes inserting a hollow needle through the vacuum bag and the patch until a tip of the vacuum needle has substantially penetrated a thickest part of the patch. The method may further comprise forming a substantially vacuum tight seal between the vacuum bag and the vacuum needle, and withdrawing the vacuum needle from the patch and from the bag after the patch has been infused with resin. The method may also comprise sealing a hole in the vacuum bag resulting from withdrawal of the vacuum needle from the vacuum bag. Infusing the patch with resin is performed by introducing resin under controlled atmospheric pressure on the outer side of the patch. Introducing the resin includes placing a spiral wrap tube around the periphery of the outer side of the patch, and coupling the spiral wrap tube with a reservoir of resin adapted to supply resin to the spiral wrap tube at partial atmospheric pressure. The method may further comprise removing excess resin from the patch through the end of the hollow needle.

According to still another embodiment, a method is provided of reworking an area of the composite structure from only one side thereof. The method comprises forming a scarf in one side of the composite structure, installing a fiber patch in the scarf, including placing including an inner side of the patch in contact with the structure, installing a vacuum bag over the patch, and inserting a hollow needle through the vacuum bag and down into the patch until a tip of the needle is near the inner side of the patch. The method further comprises forming a seal between the hollow needle and the vacuum bag, coupling the hollow needle with a vacuum reservoir, infusing the patch with resin by flowing resin into the outer side of the patch, using the hollow needle and the vacuum reservoir to force the resin to the inner side of the fiber patch, and removing excess resin in the fiber patch through the hollow needle. The method also comprises removing the hollow needle from the patch after the patch has been infused with resin. The patch may have an area of maximum thickness. Inserting the hollow needle is performed by passing a tip of the hollow needle through the area of maximum thickness of the fiber patch. The method further comprises withdrawing the hollow needle from the patch and from the vacuum bag, and sealing a hole in the vacuum bag resulting from the withdrawal of the hollow needle from the vacuum bag. Flowing resin into the outer side of the patch and using the hollow needle and vacuum reservoir force the resin to the inner side of the fiber patch may be performed using controlled partial atmospheric pressure resin infusion.

According to a further embodiment, apparatus is provided for reworking an area of a composite structure using resin infusion of a dry fiber patch having inner and outer sides. The apparatus comprises a vacuum bag adapted to be placed over the outer side of the patch for compacting the patch, and a hollow needle passing through the vacuum bag and adapted to extend down through a thickness of the patch. The apparatus also comprises a vacuum seal between the hollow needle and the vacuum bag, and a vacuum line coupled with the hollow needle for generating a vacuum at the inner side of the patch. The apparatus may further comprise a reservoir of resin for supplying resin to the outer side of the patch at a controlled partial atmospheric pressure, and a vacuum source coupled with the hollow needle for generating a vacuum at the inner side of the patch and forcing excess resin away from the patch.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 9 is an illustration of a flow diagram of aircraft production and service methodology.

FIG. 10 is illustration of a block diagram of an aircraft.

DETAILED DESCRIPTION

Figure 1:
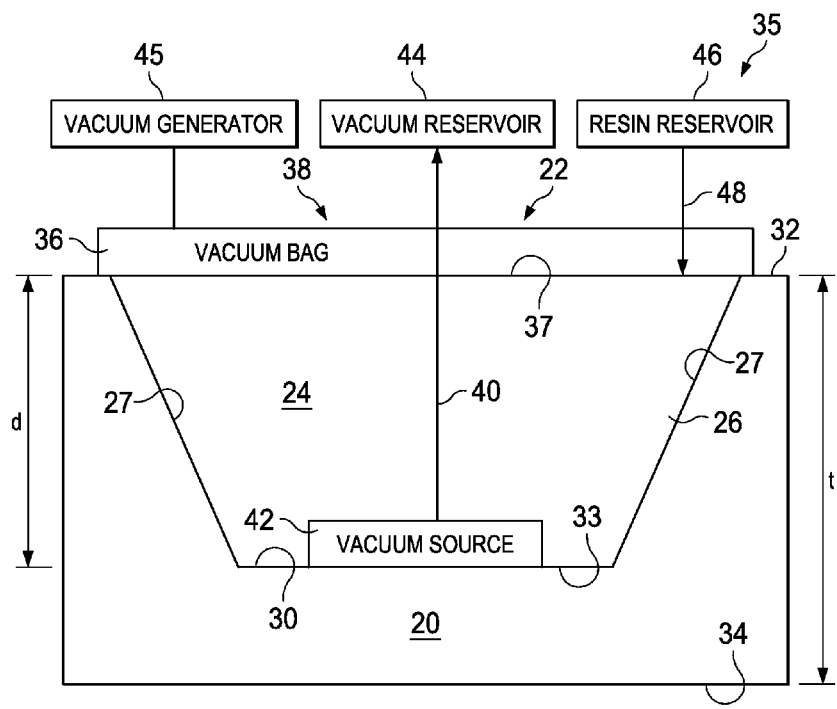
FIG. 1 is an illustration of a functional block diagram of apparatus for reworking an area of a structure from one side thereof.

Referring first to FIG. 1, the disclosed embodiments relate to a method and apparatus for reworking an area 22 (hereinafter sometimes also called "rework area") of a structure 20 that may contain inconsistencies (not shown), or which may require reinforcement. The area 22 may be reworked using a rework patch 24 in order to bring the area 22 to within design or performance specifications. The inconsistencies may comprise, without limitation, impact damage, cracks, fractures or porosities which occur at the time of manufacture, or while the structure 20 is in service.

In the illustrated example, the structure 20 comprises a composite aircraft skin 20, however the disclosed method may be employed to rework other structures formed from any of various materials, including but not limited to metals, metal composites, and ceramics.

The structure 20 includes inner side 34 which may be difficult or impossible to access by maintenance/repair personnel, and an outer side 32 that can be accessed by personnel for purposes of reworking, reinforcing and/or repairing (collectively hereinafter referred to as "reworking") the area 22 using the rework patch 24. As will be discussed below in more detail, the disclosed method and apparatus allow the area 22 to be reworked from only one side of the structure 20, which in the illustrated example, is the outer side 32 of the structure 20.

In order to rework the area 22 from the outer side 32, a portion of the structure 20 containing the inconsistencies may be removed within the rework area 22, referred to as scarfing, thereby forming a scarf cavity 26 having a depth "d" that is less than the thickness "t" of the structure 20. In other words, the scarf cavity 26 only partially penetrates the thickness "t" of the structure 20. In the illustrated example, the scarf cavity 26 has tapered sides 27, and a flat bottom 30, however in other applications, sides 27 may not be tapered, and the bottom 30 may not be flat.

The rework area 38 having been scarfed from the outer side 32 to a desired depth "d", a rework patch 24 is fabricated and placed in the scarfed cavity 26. The rework patch 24 has an inner side 33 and an outer side 37. The rework patch 24 comprises a dry fiber preform fabricated, for example, by stacking and tacking together layers of dry fiber reinforcement which may comprise knitted or woven fabric. The geometry of the rework patch 24 may match that of the scarf cavity 26. For example, in the illustrated application, the outer edges of the rework patch 24 may be tapered to match the tapered sides 27 of the scarf cavity 26. In other applications, however, the scarf cavity 26 and the rework patch 24 may have other cross-sectional profiles, including but not limited to a stepped profile. Furthermore, while a dry fiber rework patch 24 is illustrated, it may be possible to carry out the disclosed method using a fibrous reinforcement patch that has been tackified or pre-impregnated (pre-preg) with resin.

A vacuum bag 36, which may be flexible, is placed over the rework patch 24 and sealed to the surface 38 of the structure 20 on the outer side 32 of the rework patch 24. The vacuum bag 36 is coupled with a suitable vacuum generator 45 and reservoir 44 which evacuates the vacuum bag 36 in order to compact the rework patch 24 prior to, during and/or after resin infusion. Resin infusion of the rework patch 24 may be carried out using a resin infusion system 35 comprising a controlled pressure resin reservoir 46, a removable vacuum source 42 and a controlled vacuum reservoir 44. Some components of the resin infusion system 35 may be similar to those shown in U.S. Pat. No. 7,334,782 issued Feb. 26, 2008, the entire disclosure of which is incorporated by reference herein. The above mentioned U.S. patent discloses a controlled atmospheric pressure resin infusion system (CAPRI) in which the resin reservoir 46 is evacuated to a pressure below atmospheric pressure and may be used in combination with cyclic (repeated) compaction by the vacuum bag 36 to control a vacuum assisted resin transfer process. It may be possible, however, to carry out the disclosed method using other types of resin infusion techniques and equipment. Moreover, the disclosed method may be carried out within an autoclave.

The vacuum source 42 is placed beneath the thickest part of the rework patch 24, along the inner side of 33 of the repair patch 24, near the bottom 30 of the scarf cavity 26. The vacuum source 42 is coupled with the vacuum reservoir 44 by a vacuum line 40 that may pass through the vacuum bag 36. Resin from resin reservoir 46 is supplied through a resin supply tube 48 to the outer side 37 of the patch 24. The vacuum source 42 functions to reduce the pressure along the inner side 33 of the patch 24, at the bottom 30 of the scarf cavity 26, to a pressure level that is lower than the pressure within the vacuum bag 36 at the outer side 37 of the patch 24 produced by the vacuum generator 45. The pressure reduction created by the vacuum source 42 along the inner side 33 of the patch 24 results in a pressure differential between the inner and outer sides 33, 37 respectively of the patch 24, that forces resin to flow through the entire thickness of the rework patch 24. The vacuum source 42 also eliminates high-pressure areas in the thickest part of the rework patch 24, near the inner side 33, which may otherwise result in air entrapment causing porosities. Excess resin flowing through the patch 24 to the inner side 33 of the patch 24 at the bottom 30 of the scarf cavity 26 is moved away through the vacuum line 40 into the vacuum reservoir 44. Following resin infusion of the rework patch 24, the vacuum source 42 is removed from the resin infused patch 24 and sealed before curing.

Figure 2:
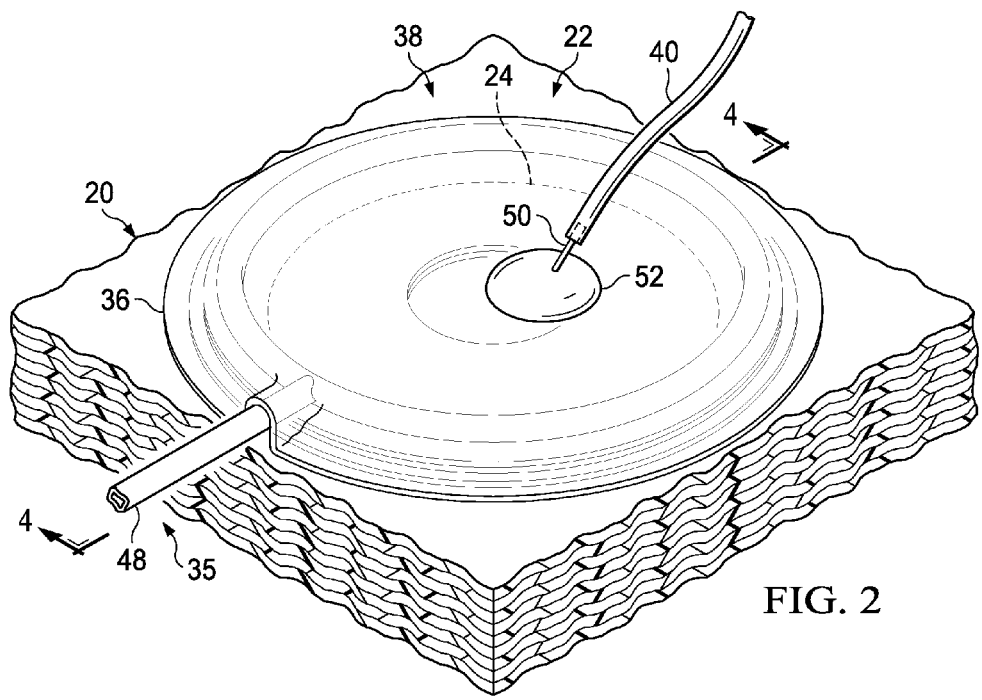
FIG. 2 is an illustration of a perspective view of a structure having an area being reworked using the disclosed apparatus.
Figure 3:
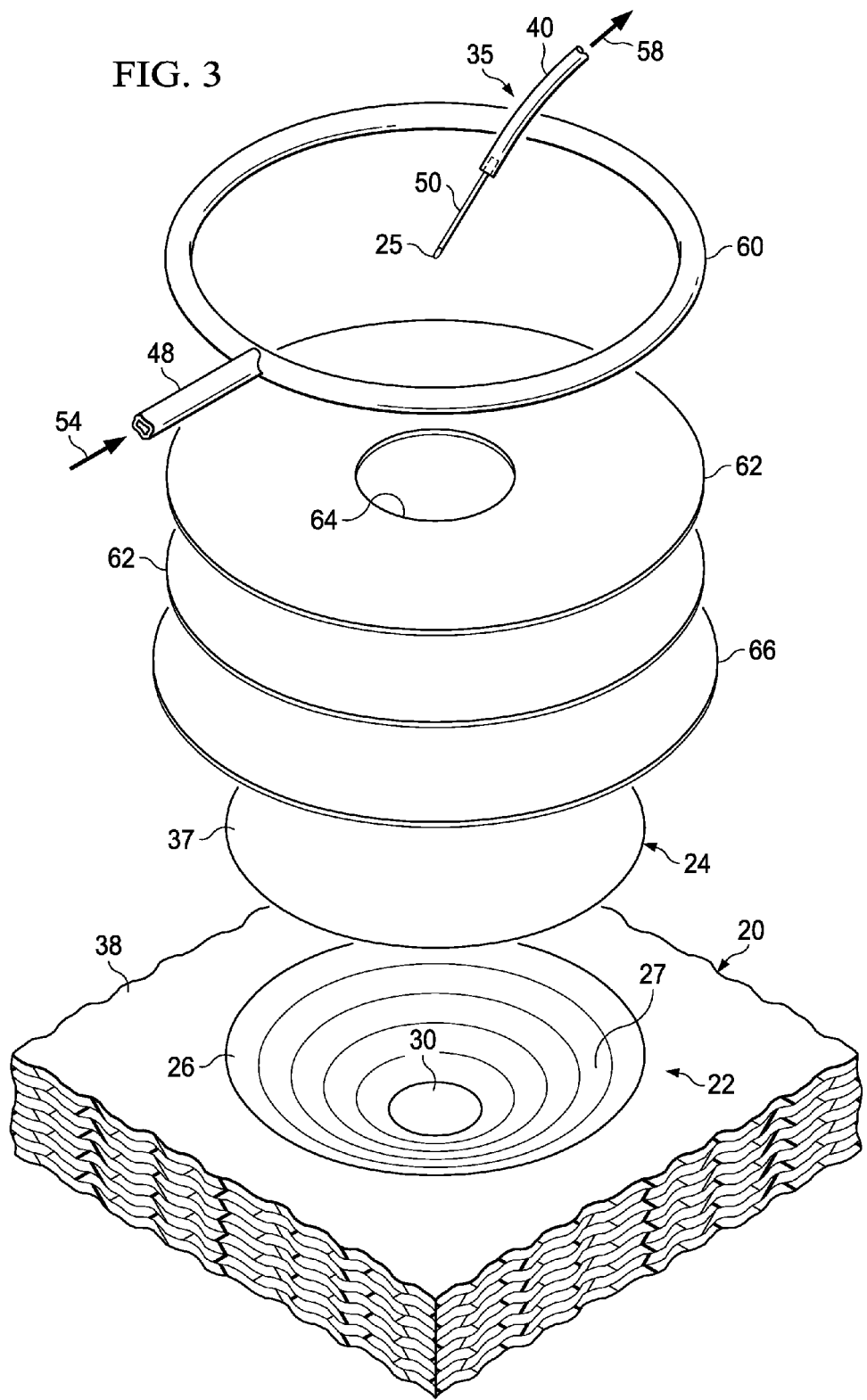
FIG. 3 is an illustration of an exploded, perspective view of the area shown in FIG. 2.
Figure 4:
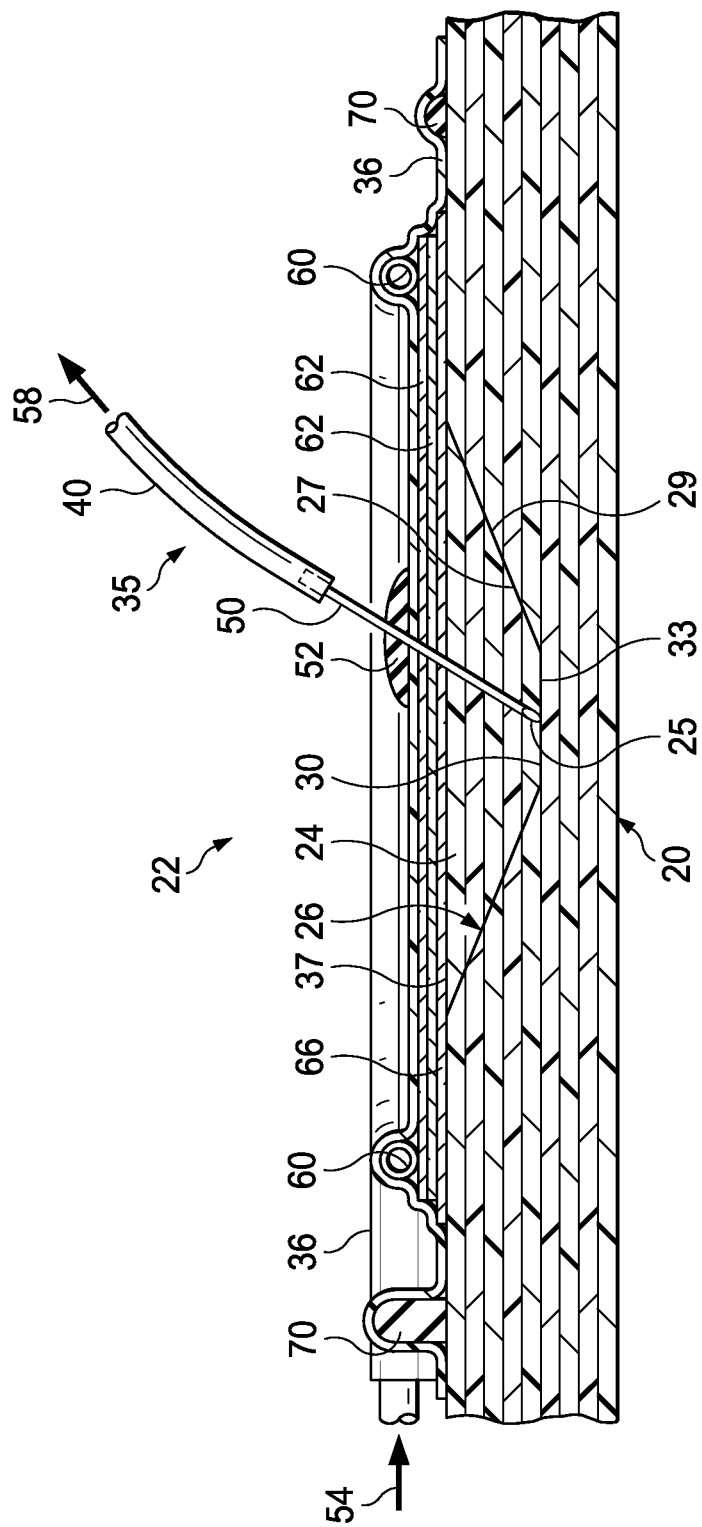
FIG. 4 is an illustration of a cross-sectional view taken along the line 4-4 in FIG. 2.

Attention is now directed to FIGS. 2, 3 and 4 which illustrate one practical embodiment of apparatus for reworking an area 26 of a structure 20. In this example, the structure 20 comprises a composite laminate skin 20, such as those used in the aircraft industry. The rework area 22 is scarfed (FIGS. 2 and 4) only partially through the thickness of the skin 20, resulting in a scarf cavity 26 having tapered sides 27 (see FIG. 3) and a generally flat bottom 30. A rework patch 24 comprising a dry fiber preform, is fabricated and placed within the scarf cavity 26, with the inner side 33 of the rework patch 24 in contact with the structure 20. The rework patch 24 may have tapered edges 29 (FIG. 4) substantially matching the tapered sides 27 of the scarf cavity 26. A release ply 66 is placed over the rework patch 24. The release ply 66 allows resin to flow therethrough and may comprise, without limitation, a porous Teflon® coated fiberglass. In the exemplary embodiment shown in the figures, the scarf cavity 26 and the rework patch 24 are each substantially circular in shape. However it should be noted that the disclosed method and apparatus may be used to rework areas 22 in which the scarf cavity 26 and the rework patch 24 are not circular, e.g. oval, square etc.

One or more plies of a porous flow media 62 (two plies are shown in the drawings) such as, without limitation, fiberglass, cover the release ply 66 and functions to distribute resin over the area of the rework patch 24. The flow media 62 may include a central, generally circular, or other shaped cutout 64 that functions to create a "dead zone" which aids in generating a desired wavefront of resin flow into the rework patch 24. In some applications, the cutout 64 may not be necessary where not required by the geometry of the patch 24. A circularly shaped, spiral wrap, resin distribution tube 60, which may be formed of a nylon or similar material, is disposed on top of the flow media 62, and extends around its periphery. The resin distribution tube 60 may have other geometries, depending upon the application, and is coupled with a resin supply tube 48. The resin supply tube 48 includes an inlet 54 that is coupled with the resin reservoir 46 (FIG. 1) which supplies resin under controlled pressure to the resin distribution tube 60. The vacuum bag 36 covers the rework patch 24 as well as the resin distribution tube 60, and is sealed to the outer surface 38 of the skin 20 by means of a suitable sealant 70, which may comprise a sealant tape.

The vacuum source 42, previously discussed in connection with FIG. 1, may comprise a vacuum device such as a vacuum needle 50. A tip 25 on one end of the hollow needle 50 is open while the other end of the hollow needle 50 is coupled with the vacuum line 40. The hollow needle 50 penetrates 47 the vacuum bag 36 and passes through the central cutout 64 in the flow media 62, down into the repair patch 24, such that the open tip 25 of the hollow needle 50 is positioned substantially along the inner side 33 of the thickest part of the rework patch 24, at the bottom 30 of the scarf cavity 26. A suitable sealant 52, which may be similar to vacuum bag sealant 70, forms a substantially vacuum tight seal between the hollow needle 50 and the vacuum bag 36 at the point where the hollow needle 50 penetrates 47 (FIG. 4) the vacuum bag 36.

In use, after the rework patch 24 has been placed in the scarf cavity 26, and the resin distribution tube 60 and flow media 62 have been installed, resin infusion may be commenced and the vacuum bag 36 is evacuated to apply compaction pressure to the rework patch 24. Resin supplied under pressure from the resin reservoir 46 flows through the resin supply tube 48 and then into the resin distribution tube 60 where it flows onto and through the flow media 62. The flowing resin covers the flow media 62 which assists in evenly distributing the flowing resin over the upper surface of the rework patch 24. The vacuum reservoir 44 generates a vacuum in vacuum line 40 that results in the open tip 25 of the hollow needle 50 reducing the pressure at the thickest part of the rework patch 24, near the bottom 30 of the scarf cavity 26. The low pressure area at the open tip 25 is less than the pressure on the incoming resin. This reduced pressure at the open tip 25 causes any air or other volatiles in the rework patch 24 to be forced away, while the resin is forced down through the rework patch 24 to its thickest part. The pressure gradient assures that the rework patch 24 is fully infused with resin and that air does not become entrapped within the rework patch 24 during the resin infusion process. Excess resin, along with any air/volatiles present in the rework patch 24, are moved into the tip 25 and through the hollow needle 50 into the vacuum line 40 which carries the excess resin/air/volatiles to the vacuum reservoir 44.

The rework patch 24 may be cyclically compacted by using the vacuum bag 36. Here, air is introduced into the dry fiber preform and then evacuated in a cyclical manner, thereby further compacting the preform. The pressure in the resin reservoir 46 may be varied in relation to the pressure within the vacuum bag 36 in order to better control the net compaction pressure applied to the rework patch 24 as it is being infused with resin. The size of the open tip 25 of needle 50 may be chosen to allow free resin flow through the needle 50 enough to overcome the natural frictional forces on the walls of the needle 50 while minimizing the diameter of the penetration made in the vacuum bag 36. When the rework patch 24 is nearly fully impregnated with resin, excess resin will begin to flow through the hollow needle 50 into vacuum line 40 and is collected in the vacuum reservoir 44. The amount of vacuum pressure within the vacuum bag 36 may be adjusted so as to induce the flow of excess resin into the needle 50. The pressure within the vacuum reservoir 44 may also be adjusted so as to induce flow of excess resin through the hollow needle 50 and into the vacuum reservoir 44. Upon completion of resin infusion of the rework patch 24, and prior to curing, the needle 50 may be withdrawn from the rework patch 24 and a hole (not shown) remaining in the vacuum bag 36 due to previous penetration by the needle 50 may be sealed using a suitable sealant, such as vacuum bag sealant, in order to maintain vacuum integrity of the bag 36 during curing.

Figure 5:
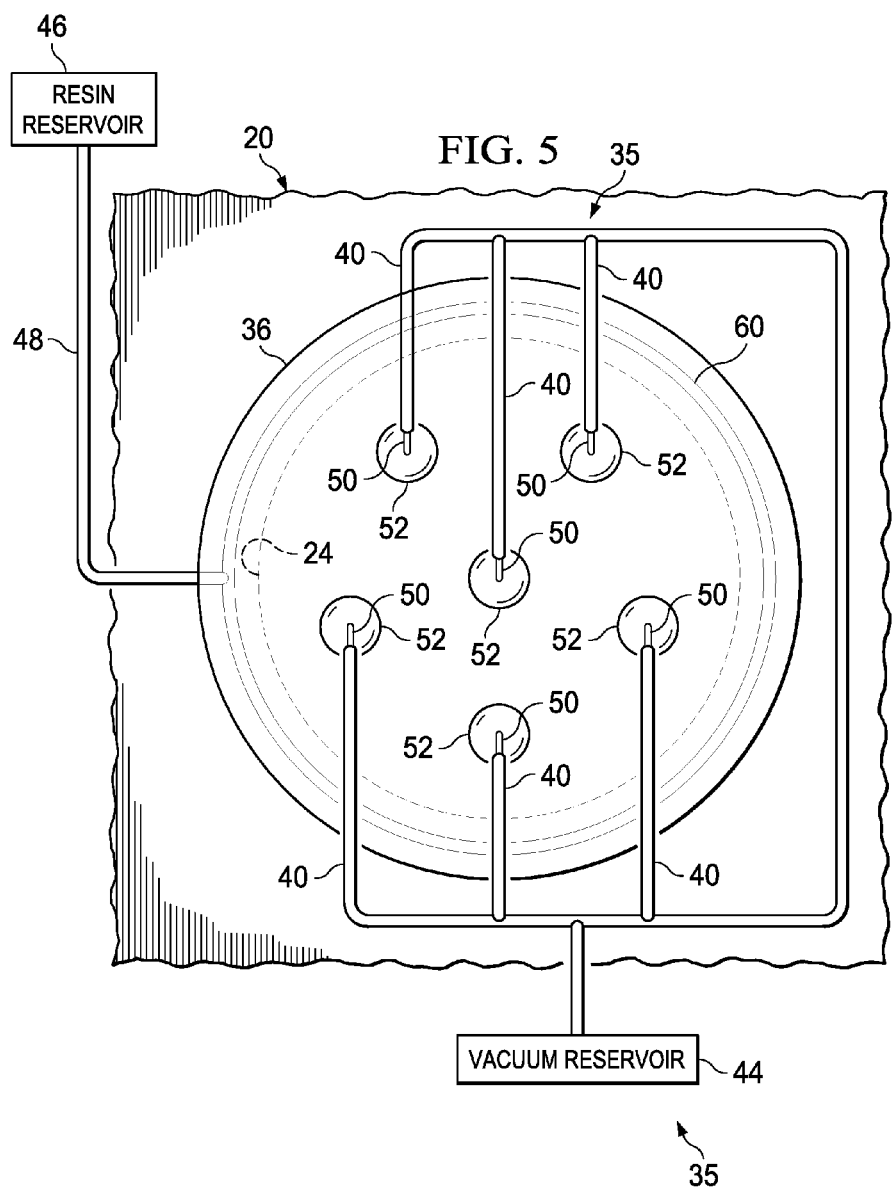
FIG. 5 is an illustration of a plan view of a large area of a structure being reworked using an alternate form of the apparatus.

Depending upon the application, it may be necessary or desirable to place more than one vacuum source 42 (FIG. 1) near thicker parts of a rework patch 24 having a large area. For example, referring to FIG. 5, a relatively large area rework patch 24 is provided with multiple hollow needles 50 at spaced apart locations. Seals 52 seal each of the needles 50 to a vacuum bag 36 which covers the entire area of the rework patch 24. A series of resin exit lines 40 couple the hollow needles 50 with a vacuum reservoir 24 that reduces the internal pressure in the rework patch 24 at the locations of the needles 50. Resin is flowed into the rework patch 24 through a spiral wrap resin distribution tube 60 that is coupled with a resin reservoir 46 by a resin supply tube 48.

Figure 6:
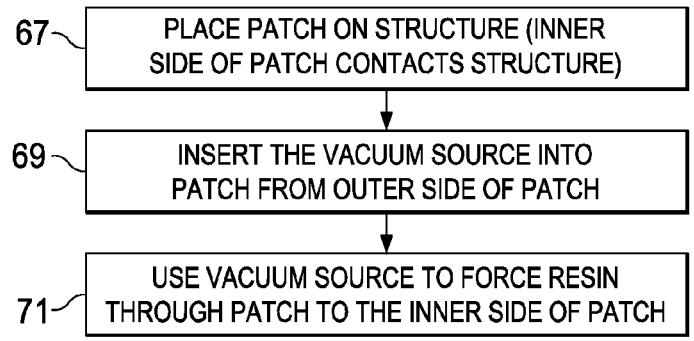
FIG. 6 is an illustration of a flow diagram of a method of reworking a structure.

FIG. 6 shows the overall steps of a method of reworking a structure 20 using a vacuum source 42 that is placed within the patch 24 and used to resin through the patch 24. Beginning at step 67, a suitable patch 24 is placed on the structure 20, with the inner side 33 of the patch 24 in contact with the structure 20. At 69, a vacuum source 42 is inserted into the patch 24 from the outer side 37 of the patch 24. Then, at step 71, the vacuum source 42 is used to resin through the patch 24 to the inner side 33 of the patch 24. If desired, an adhesive ply, nominally 0.005-0.010 inches in thickness, or other means of enhancing the bondline 39 may be placed between the dry fiber patch 24 and the scarf cavity 26.

Figure 7:
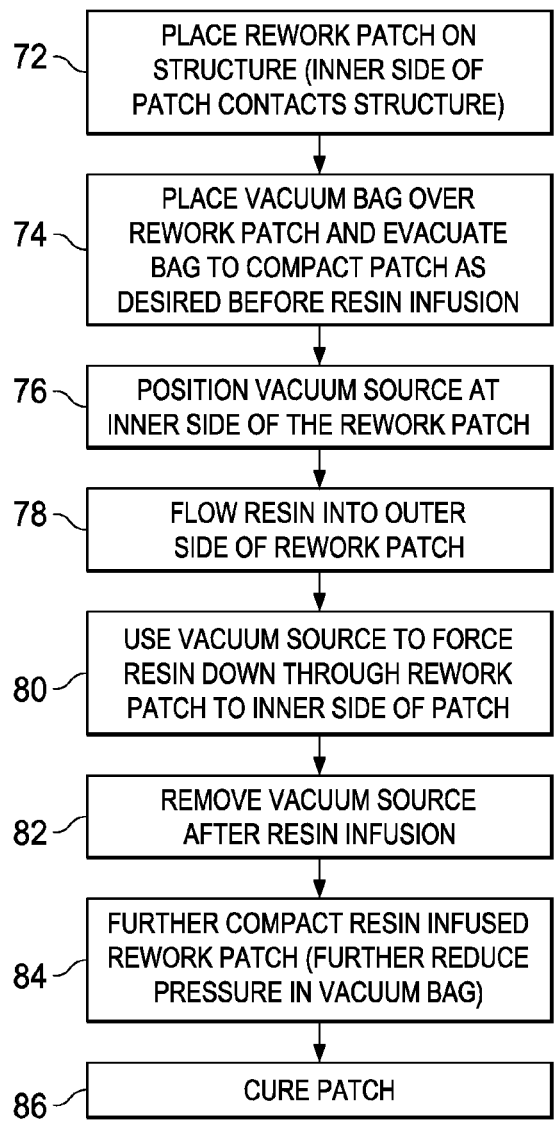
FIG. 7 is an illustration of a flow diagram of a method of reworking a structure from one side thereof.

Attention is now directed to FIG. 7 which illustrates the overall steps of another method of reworking an area of a structure 20 using a resin infused rework patch 24. Beginning at 72, a dry fiber rework patch 24 is placed on the structure 20, such that an inner side 33 of the patch 24 is in contact with the structure 20. If desired, an adhesive ply, nominally 0.005-0.010 inches in thickness, or other means of enhancing the bondline 39, may be placed between the dry fiber patch 24 and the scarf cavity 26. At 74, a vacuum bag 36 is placed over the rework patch 24 and is sealed to the structure 20. The vacuum bag 36 may be evacuated to compact the dry fiber rework patch 24 as desired, prior to its infusion with resin. At 76, a vacuum source 42 is positioned at the inner side 33 of the rework patch 24. At step 78, resin is flowed onto the outer side 37 of the rework patch 24, and at 80, the vacuum source 42 is used to force resin down through the rework patch 24 to the inner side 33 of the rework patch 24 while reducing pressure on the inner side 33 of the patch 24. At step 82, the vacuum source 42 is removed after infusion of the rework patch 24 with resin. The vacuum bag may 36 may maintain a desired level of compaction pressure on the rework patch 24 as it is being infused with resin during steps 78 and 80. At step 84, the resin infused rework patch 24 may be further compacted by reducing the pressure within the vacuum bag 36. At step 86, the resin infused patch 24 is cured.

Figure 8:
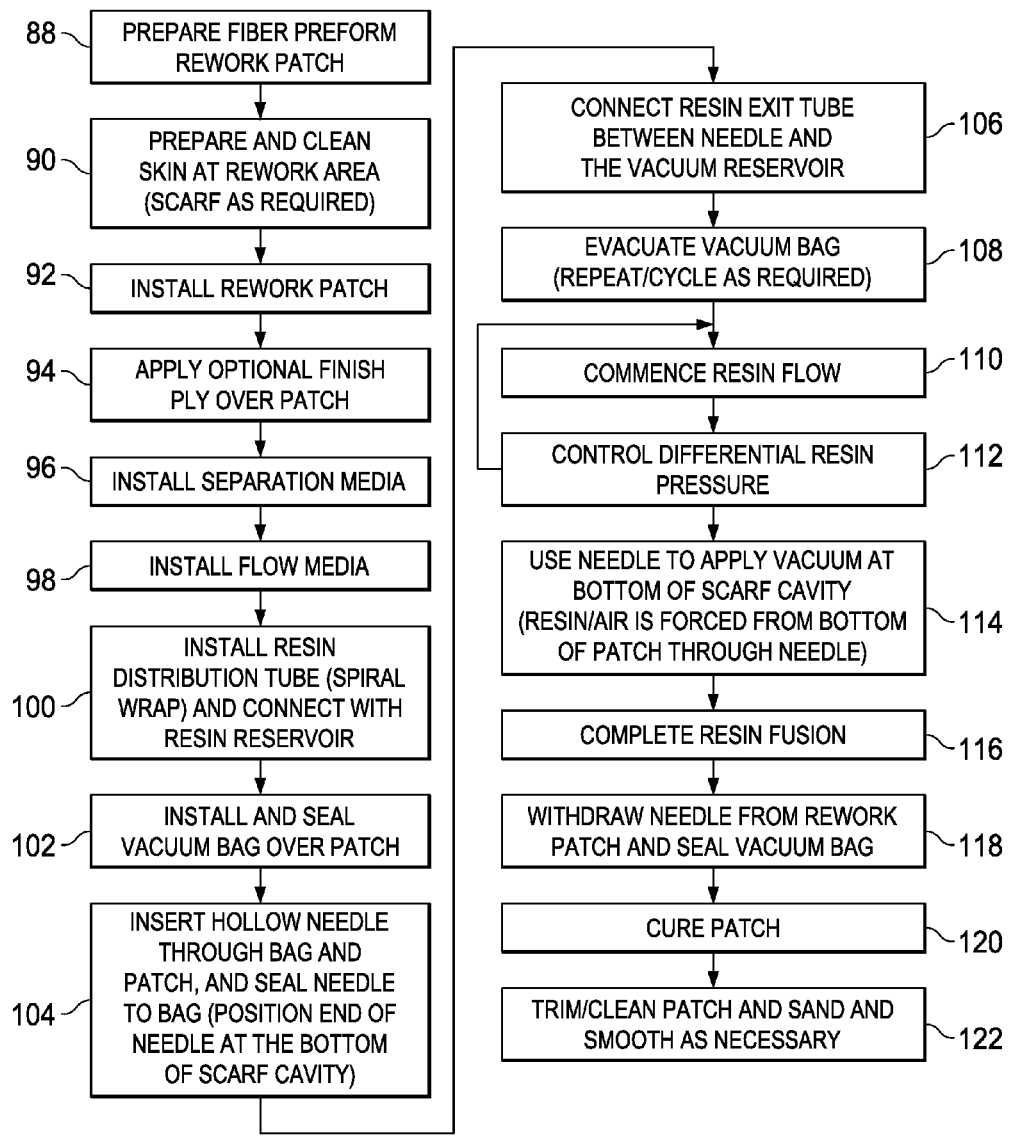
FIG. 8 is an illustration of a flow diagram of a method of reworking an area of a composite skin using the disclosed method and apparatus.

FIG. 8 illustrates the steps of a method of reworking a composite skin 20 according to the disclosed embodiments. At 88, a dry fiber preform rework patch 24 is prepared, as by tacking together layers of woven or knitted dry fabric. At 90, the skin 20 is prepared and cleaned in the area 22 to be reworked, and may be scarfed, as required, to remove inconsistencies and form a scarf cavity 26 into which the rework patch 24 may be placed. At step 92, the rework patch 24 is installed in the scarf cavity 26. If desired, an adhesive ply, nominally 0.005-0.010 inches in thickness, or other means of enhancing the bondline 39 may be placed between the dry fiber patch 24 and the scarf cavity 26. Optionally, a finish ply (not shown) may be applied over the rework patch 24 at step 94. At step 96, separation media such as a release ply 66 is installed, following which flow media 62 is installed at step 98. At step 100, a resin supply tube which may comprise a spiral wrap resin distribution tube 60 is installed and connected with a resin reservoir 46. At 102, a vacuum bag 36 is installed in sealed over the rework patch 24. At step 104, a hollow needle 50 is inserted through the vacuum bag 36 and through the thickest part of the rework patch 24, and the needle 50 is sealed to the vacuum bag 36. During insertion of the hollow needle 50, an open tip 25 of the needle 50 is positioned at the bottom of the scarf cavity, at a location where the rework patch 24 has a maximum thickness at the inner side 33 of the rework patch 24.

At 106, a resin exit line 40 is connected between the hollow needle 50 and a vacuum reservoir 44. The vacuum bag 36 is evacuated at step 108 to begin compacting the rework patch 24. At 110, resin flow is commenced by flowing resin from the resin reservoir 46 through the resin distribution tube 60 onto the flow media 62. At 112, the flow of resin through the rework patch 24 is controlled by controlling the relative pressures of the resin reservoir 46 supplying resin to the rework patch 24, and the vacuum reservoir 44 used to locally reduce pressure at the thickest part of the rework patch 24 and move away excess resin. At 114, the hollow needle 50 is used to apply a vacuum at the bottom 30 of the scarf cavity 26 which both reduces pressure at the thickest part of the rework patch 24 and forces excess resin away from the rework patch 24 into the vacuum reservoir 44. The vacuum applied by the hollow needle 50 is lower than the pressure on the incoming resin, thus creating a pressure differential that drives the resin to flow to the bottom of the scarf cavity 26. At 116, the resin infusion process is completed, following which, at 118, the needle 50 is withdrawn from the rework patch 24 and a hole remaining in the vacuum bag due to previous penetration by the needle 50 is sealed. The rework patch 24 is cured at step 120, and at 122 the cured rework patch 24 may be trimmed, cleaned, sanded and smoothed, as necessary.

Embodiments of the disclosure may find use in a variety of potential applications, particularly in the transportation industry, including for example, aerospace, marine, automotive applications and other application where automated layup equipment may be used. Thus, referring now to FIGS. 9 and 10, embodiments of the disclosure may be used in the context of an aircraft manufacturing and service method 124 as shown in FIG. 9 and an aircraft 126 as shown in FIG. 10. Aircraft applications of the disclosed embodiments may include, for example, without limitation, composite skins and other load carrying structures. During pre-production, exemplary method 124 may include specification and design 128 of the aircraft 126 and material procurement 130. During production, component and subassembly manufacturing 132 and system integration 134 of the aircraft 126 takes place. Thereafter, the aircraft 126 may go through certification and delivery 136 in order to be placed in service 138. While in service by a customer, the aircraft 126 is scheduled for routine maintenance and service 140, which may also include modification, reconfiguration, refurbishment, and so on. The disclosed method may be employed to rework, repair or reinforce structural areas of the aircraft 126 while in service.

Each of the processes of method 124 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 126 produced by exemplary method 124 may include an airframe 142 with a plurality of systems 144 and an interior 146. Examples of high-level systems 144 include one or more of a propulsion system 148, an electrical system 150, a hydraulic system 12 to, and an environmental system 154. Any number of other systems may be included. Although an aerospace example is shown, the principles of the disclosure may be applied to other industries, such as the marine and automotive industries.

Systems and methods embodied herein may be employed during any one or more of the stages of the production and service method 124. For example, components or subassemblies corresponding to production process 128 may be reworked while the aircraft 126 is in service. Also, one or more apparatus embodiments, method embodiments, or a combination thereof may be utilized during the production stages 132 and 134, for example, by substantially expediting assembly of or reducing the maintenance cost of an aircraft 126. Similarly, one or more of apparatus embodiments, method embodiments, or a combination thereof may be utilized while the aircraft 126 is in service, for example and without limitation, to maintenance and service 140.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of reworking an area of a structure, comprising:
   placing a patch on the structure, including placing an inner side of the patch against the structure, wherein placing the patch on the structure includes:
   placing a dry fiber patch on the structure, and
   placing a bond enhancing layer between the dry fiber patch and the structure;
   inserting a vacuum source into the patch from an outer side of the patch, the vacuum source comprising an open tip of a hollow needle;
   flowing resin onto the outer side of the patch; and,
   using the vacuum source to force resin through the patch to an inner side of the patch.

2. The method of claim 1, further comprising:
   placing a vacuum bag over the outer side of the patch.

3. The method of claim 2, further comprising:
   removing the vacuum source from the patch after the patch has been infused with resin.

4. The method of claim 3, further comprising:
   forming a scarf partially through a thickness of the structure, and
   wherein placing the fiber patch on the structure includes placing the inner side of the patch against a bottom of the scarf, and inserting the vacuum source includes inserting the hollow needle down through a thickest part of the patch to substantially the bottom of the scarf.

5. The method of claim 4, wherein inserting the vacuum source further includes inserting the hollow needle through the vacuum bag, and forming a substantially vacuum tight seal between the hollow needle and the vacuum bag.

6. The method of claim 5, wherein removing the vacuum source from the patch includes:
   withdrawing the hollow needle from the patch and from the vacuum bag, and
   sealing a hole in the vacuum bag resulting from penetration of the vacuum bag during insertion of the hollow needle through the vacuum bag.

7. The method of claim 1, wherein inserting the vacuum source into the patch includes:
   inserting a plurality of hollow needles through the patch at spaced apart locations over an area of the patch.

8. The method of claim 1, wherein using the vacuum source to force resin through the patch to an inner side of the patch comprises creating a pressure differential between the inner and outer sides that drives resin to flow to the inner side of the patch.

9. The method of claim 1, wherein flowing resin onto the outer side of the patch includes:
   placing a resin distribution tube on the outer side of the patch beneath the vacuum bag, and
   supplying resin into the resin distribution tube.

10. A method of reworking an area of a structure, comprising:

forming a scarf partially through a thickness of the structure;
fabricating a dry fiber patch having an inner side and an outer side;
installing the fiber patch within the scarf, including placing the inner side of the fiber patch against the structure at a bottom of the scarf, wherein placing the fiber patch within the scarf includes:
  placing a dry fiber patch on the structure within the scarf, and
  placing a bond enhancing layer between the dry fiber patch and the structure;
installing a vacuum bag over the outer side of the fiber patch;
inserting a vacuum device from the outer side of the fiber patch through the fiber patch, the vacuum device comprising an open tip of a hollow needle;
infusing the fiber patch with resin by introducing resin on the outer side of the fiber patch;
using the vacuum device to force resin through the fiber patch to the inner side of the fiber patch; and,
removing the vacuum device from the fiber patch after the fiber patch has been infused with resin.

11. The method of claim 10, wherein inserting the vacuum device through the fiber patch includes inserting the hollow needle through the vacuum bag and the fiber patch until a tip of the hollow needle has substantially penetrated a thickest part of the fiber patch.

12. The method of claim 11, further comprising:
forming a substantially vacuum tight seal between the vacuum bag and the hollow needle.

13. The method of claim 11, further comprising:
withdrawing the hollow needle from the fiber patch and from the bag after the fiber patch has been infused with resin.

14. The method of claim 13, further comprising sealing a hole in the vacuum bag resulting from withdrawal of the hollow needle from the vacuum bag.

15. The method of claim 10, wherein infusing the fiber patch with resin is performed by introducing resin under controlled atmospheric pressure on the outer side of the fiber patch.

16. The method of claim 15, wherein introducing resin includes:
placing a spiral wrap around a periphery of the outer side of the fiber patch for introducing the resin on the outer side of the fiber patch, and
coupling the spiral wrap with a reservoir of resin adapted to supply resin to the spiral wrap at partial atmospheric pressure.

17. The method of claim 10, wherein compacting the fiber patch is performed and maintained after the vacuum device has been removed from the fiber patch.

18. The method of claim 11, further comprising:
removing excess resin from the fiber patch through the tip of the hollow needle.

19. A method of reworking an area of a composite structure from only one side of the composite structure, comprising:
forming a scarf in one side of the composite structure;
installing a fiber patch in the scarf, including placing an inner side of the fiber patch in contact with the structure, wherein installing the fiber patch in the scarf includes:
  placing a dry fiber patch on the structure in the scarf, and
  placing a bond enhancing layer between the dry fiber patch and the structure;
installing a vacuum bag over an outer side of the fiber patch;
inserting a hollow needle through the vacuum bag and down into the fiber patch until a tip of the needle is near the inner side of the fiber patch;
forming a seal between the hollow needle and the vacuum bag;
coupling the hollow needle with a vacuum reservoir;
compacting the fiber patch;
infusing the fiber patch with resin by flowing resin onto an outer side of the fiber patch and using the hollow needle and the vacuum reservoir to force the resin to the inner side of the fiber patch;
removing excess resin in the fiber patch through the tip of the hollow needle;
removing the hollow needle from the fiber patch after the fiber patch has been infused with resin;
sealing a hole in the vacuum bag caused by penetration of the vacuum bag by the hollow needle; and
compacting the resin infused fiber patch by evacuating the vacuum bag.

20. The method of claim 19, wherein the fiber patch has an area of maximum thickness, and inserting the hollow needle is performed by passing the tip of the hollow needle through the area of maximum thickness of the fiber patch.

21. The method of claim 19, further comprising:
withdrawing the hollow needle from the fiber patch and from the vacuum bag, and
sealing a hole in the vacuum bag resulting from the withdrawal of the hollow needle from the vacuum bag.

22. The method of claim 19, wherein flowing resin into the outer side of the fiber patch and using the hollow needle and vacuum reservoir force the resin to the inner side of the fiber patch is performed using controlled partial atmospheric pressure resin infusion.

23. The method of claim 1, wherein the patch comprises layers of dry fiber reinforcement, and wherein the outer side is parallel to the layers.

* * * * *